United States Patent [19]

Kawarada et al.

[11] Patent Number: 4,490,015
[45] Date of Patent: Dec. 25, 1984

[54] LIQUID CRYSTAL COLOR DISPLAY PANEL

[75] Inventors: Hiroshi Kawarada, Hirakata; Toshio Tatsumichi, Ando; Yasuo Wakahata, Katano; Mitsuyoshi Hamanaka, Kadoma; Tamotsu Kajitani, Suita, all of Japan

[73] Assignee: Matsushita Electric Industrial Co., Ltd., Osaka, Japan

[21] Appl. No.: 381,909

[22] Filed: May 25, 1982

[30] Foreign Application Priority Data

May 25, 1981 [JP] Japan .................................. 56-79653

[51] Int. Cl.³ ........................ G02F 1/13; G02F 1/133; C09K 3/34
[52] U.S. Cl. .............................. 350/340; 252/299.01; 252/299.1; 252/299.4; 252/299.63; 252/299.67; 350/334; 350/349; 350/350 R; 428/1
[58] Field of Search ............ 252/299.1, 299.01, 299.63, 252/299.4, 299.67; 350/340, 334, 349, 350 R; 428/1

[56] References Cited

U.S. PATENT DOCUMENTS

| 4,030,997 | 6/1977 | Miller et al. ....................... 350/340 |
| 4,112,157 | 9/1978 | Krueger et al. ..................... 350/340 |
| 4,252,417 | 2/1981 | Scheffer et al. ..................... 350/349 |
| 4,279,770 | 7/1981 | Inukai et al. ................... 252/299.64 |
| 4,281,903 | 8/1981 | Gharadjedachi ................... 350/349 |
| 4,291,949 | 9/1981 | Wada et al. ......................... 350/349 |
| 4,357,374 | 11/1982 | Ogawa ................................ 350/349 |
| 4,400,059 | 8/1983 | Nagae et al. ........................ 350/349 |

FOREIGN PATENT DOCUMENTS 35155 9/1981 European Pat. Off. ....... 252/299.66

Primary Examiner—Teddy S. Gron
Attorney, Agent, or Firm—Wenderoth, Lind & Ponack

[57] ABSTRACT

The present invention provides a liquid crystal color display panel of improved positive contrast by utilizing the so-called Guest-Host effect.

11 Claims, 10 Drawing Figures

LIQUID CRYSTAL COLOR DISPLAY PANEL

The present invention relates to a liquid crystal color display panel utilizing the so-called Guest-Host effect and more particularly to an improved positive contrast liquid crystal color display panel.

The Guest-Host effect refers to the fact that when a voltage is applied to a layer of a system formed by dissolving a dichroic dye which is anisotropic in light absorption, as a guest, in a liquid crystal material, as a host there occurs a change in the alignment of the liquid crystal molecules, followed by a change in the alignment of the dichroic dye molecules, with the result that there develops a change in light absorbance. This change in absorbance is utilized for display purposes. If a nematic liquid crystal having negative dielectric anisotropy is used as a host material, and the initial molecular alignment in the liquid crystal and the dichroic dye is perpendicular to the surface of the substrates, there is an achromatic condition with a minimum of light absorption, and when a voltage is applied, the liquid crystal and dye molecules are aligned in parallel to the substrate to increase light absorption significantly; thus, a "positive contrast display" is produced which provides colored patterns on a colorless background.

In this positive contrast display utilizing the guest-host effect, if the host liquid crystal is one which can produce a helical structure of molecular alignment, as formed by addition to the nematic liquid crystal an optically active material (chiral compound) having an asymmetric carbon, and not a mere nematic liquid crystal with negative dielectric anisotropy, upon application of a voltage, the dye molecules are oriented in various directions parallel to the substrate surface and thus light absorption is increased to give a higher color density without using a polarizer, so that a brighter display with wider viewing angle can be provided. However, positive display panels of this system have involved several difficulties such as non-uniformity of initial alignment, poor achromatization, and non-uniform displayed pattern as often developed upon voltage application. Further, there is much to be desired as to their response times.

Conventionally, in order to obtain positive contrast display panels, there have been employed two ways of alignment preparation with respect to substrate surfaces: (1) perpendicular alignment preparation without tilt given to two substrates, and (2) tilted perpendicular alignment preparation given to both of them. FIGS. 1(a) and 1(b) illustrate case (1) above where the both substrates have been given preparation for perpendicular alignment without tilt. Numerals 1 and 2 are transparent substrates made of glass or the like, which carry transparent electrodes 3 and 4 respectively on their internal surfaces. Numeral 5 designates nematic liquid crystal molecules having negative dielectric anisotropy, and numeral 6 represents dichroic dye molecules. These molecules are enclosed between the substrates 1 and 2. 7 is a power supply for applying a voltage across the electrodes 3 and 4. FIG. 1(a) shows liquid crystal molecules 5 and dye molecules 6 as arranged in the so-called perpendicular alignment mode in the vicinity of the substrates 1 and 2, without tilt relative to a normal line to the surfaces of the substrates. When in this condition, the dye molecules absorb little light, and therefore, the face of the display panel is almost colorless. The state of molecules as observed when a voltage V which is higher than the threshold voltage $V_{th}$ for the display panel, is applied is shown in FIG. 1(b). Because of the addition of an optically active material (chiral compound) thereto, the liquid crystal molecules 5 and dye molecules 6 between the electrodes 3 and 4 present a helical structure of alignment such that molecules other than those located adjacent to the electrodes on the substrates are oriented in various directions parallel to the substrates. Accordingly, the dye molecules oriented in such various directions between the electrodes 3 and 4 absorb light enough to produce a display condition with high color density.

FIGS. 2(a) and 2(b) illustrate above said case (2) in which tilted perpendicular alignment preparation is given to the both substrates. In the vicinity of the substrates 1 and 2 there are tilt-aligned nematic liquid crystal molecules 5 having negative dielectric anisotropy and dichroic dye molecules 6 at angle $\alpha(\alpha>0)$ relative to a normal line to the surfaces of the substrates (FIG. 2(a)). When a voltage V, higher than $V_{th}$, from power supply 7 is applied across the electrodes 3, 4, as shown in FIG. 2(b), a phenomenon similar to that in FIG. 1(b) develops, a color pattern being thus produced.

However, these conventional modes of alignment preparation of the substrates, that is, perpendicular alignment without tilt (FIG. 1) and tilted perpendicular alignment (FIG. 2), have their advantages and disadvantages in respect of display-surface uniformity, achromatization, response time, and/or display voltage characteristics. To obtain a display panel of practical use, they both have difficulties yet to be overcome. In the case of perpendicular alignment without tilt with respect to both substrates, the difficulty is that while in the initial condition, that is, after displaying material consisting of nematic liquid crystal with negative dielectric anisotropy (hereinafter referred to as Nn liquid crystal), optically active material (chiral compound) (hereinafter referred to as Ch material), and dichroic dye (hereinafter referred to as dye) has been enclosed between the substrates following such alignment preparation and before a voltage is applied, the display panel may be free of alignment irregularity and exhibit good achromatic performance, a color pattern produced upon application of a voltage involves worm-hole-like irregularities. With regard to response time, decay time $\tau_d$ (or time involved in downward change of color density from 100% to 10% when the panel is deenergized) is short, but rise time $\tau_r$ (or time involved in upward change of color density from 0% to 90% when the panel is energized) is long. With regard to display voltages $V_{10}$, $V_{90}$ (voltages at which 10% and 90% of saturated color density are obtainable respectively), the difference between them is relatively small (showing that the slope of display voltage characteristic becomes more sharp), but their values are relatively high. On the other hand, where the mode of tilted perpendicular molecular alignment relative to both substrates is employed, alignment irregularities are likely to develop at the initial stage following insertion of the displaying material and prior to voltage application, and achromatization is poor if tilt angle $\alpha$ is large. With regard to response time, rise time $\tau_r$ is short, but decay time $\tau_d$ is long. However, color pattern produced upon voltage application is uniform without color density irregularities. Values of display voltages $V_{10}$, $V_{90}$ are relatively low, but voltage difference $V_{90}-V_{10}$ is relatively large. The slope of display voltage characteristic is not sharp.

An object of the present invention is to eliminate such drawbacks found with display panels of the type having perpendicular molecular alignment without tilt and/or tilted perpendicular molecular alignment relative to both substrates.

Another object of the present invention is to provide efficiently a positive contrast liquid crystal color display panel having satisfactory display characteristics.

These and other objects and features of the present invention shall be fully apparent hereinafter from the following descriptions taken with the accompanying drawings in which:

FIGS. 1(a), 1(b), 2(a), 2(b) are schematic views in section illustrating display behavior of conventional positive contrast liquid crystal color display panel utilizing guest-host effect;

FIGS. 3(a) and 3(b) are schematic views illustrating a positive contrast liquid crystal color display panel in accordance with the present invention;

Figure 1A:
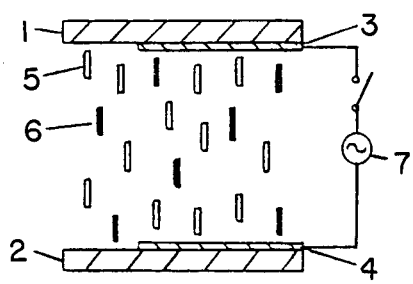
Figure 1B:
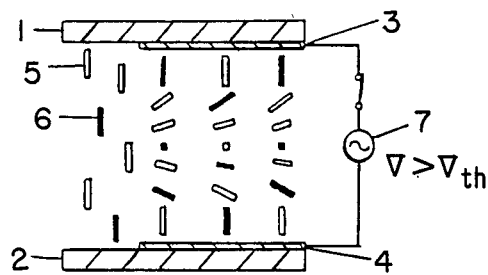
Figure 2A:
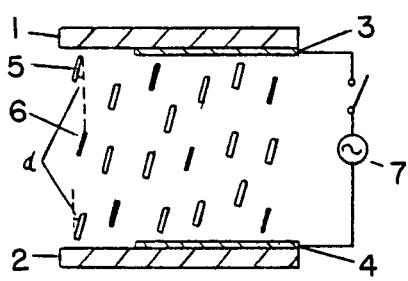
Figure 2B:
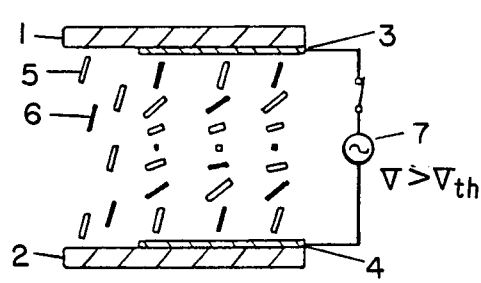
Figure 3A:
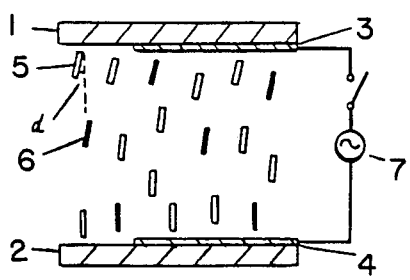
Figure 3B:
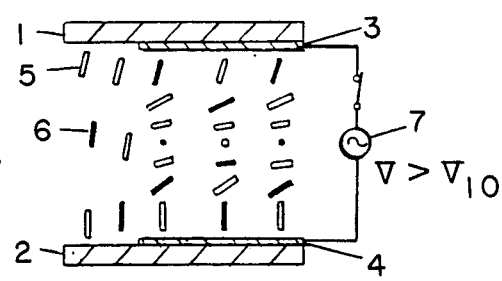

FIG. 3(a) and 3(b) show the mode of alignment of liquid crystal and dye molecules in accordance with the invention, with one substrate 1 subjected to tilted perpendicular alignment preparation and another substrate 2 subjected to perpendicular alignment preparation without tilt. The substrates 1 and 2 are glass substrates which are provided on the internal side with electrodes 3 and 4, respectively, both of which are transparent electrodes of indium tin oxide or the like. Numeral 5 designates Nn liquid crystal moleculres, 6 designates dye molecules, and 7 is a power supply. FIG. 3(a) shows a condition prior to voltage application, in which liquid crystal molecules 5 and dye molecules 6 in the vicinity of the substrate 1 take a pattern of alignment with their longitudinal axes tilted at small angle $\alpha$ in a given direction relative to a line normal to the substrate, whereas those in the vicinity of the substrate 2 take a pattern of perpendicular alignment without tilt relative to a line normal to the substrate. By employing a substrate subjected to tilted perpendicular alignment preparation for one of the two substrates of the display panel as above said it is possible that liquid crystal and dye molecules are perpendicularly aligned with a small tilt angle in a given direction in areas other than adjacent to the other substrate, which has been given perpendicular alignment preparation. A tilt angle $\alpha$ is selected in such a way that, if the two substrates are given tilted perpendicular alignment preparation and if a mixture of Nn liquid crystal and dye is enclosed between them, the condition $0 < \alpha \leq 4°$ can be met. The reason is that a tilt angle $\alpha$ of 4° or below will do little to produce color, good achromatic condition being thus obtainable, whereas if $\alpha$ is greater than 4°, color will develop on the panel surface to a substantial degree when no voltage is applied.

Figure 4:
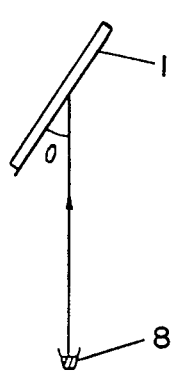
FIG. 4 is a view showing substrate positioning in the process of oblique evaporation.

For the purpose of tilted perpendicular alignment preparation, the surface of the substrate is subjected to oblique evaporation thereon of oxide or fluoride compound such as SiO, $SiO_2$, $CeO_2$, $Al_2O_3$, $MgF_2$, $CaF_2$, or LiF, and then treated with a solution of a perpendicular orientation agent (surface coupling agent) which may be an organic silane compound such as $C_{18}H_{37}(CH_3)_2ClN(CH_2)_3Si(OCH_3)_3$ or $C_{18}H_{37}Si(OC_2H_5)_3$, or lecithin. Another method is that a thin layer of $SiO_2$, $TiO_2$, $CeO_2$, or $Al_2O_3$ is formed on the surface of the substrate by means of electron-beam heated evaporation in vacuum, sputtering, or coat-baking of a solution of organic silicon or titanium compound such as $Si(OR)_4$ or $Ti(OR)_4$ (where R is an alkyl radical), and then the so-formed layer is subjected to rubbing in a given direction before it is treated with above said surface coupling agent. Treatment with surface coupling agent may be given by immersion, rotary coating, or spraying. In order to meet said condition $0 < \alpha \leq 4°$, as FIG. 4 shows, for example, SiO is deposited on the substrate 1 to a thickness of 10 Å or so at an angle $\theta$, e.g., 5° through an evaporation source 8, and the so deposited film is then treated with said solution of surface coupling agent such as $C_{18}H_{37}(CH_3)ClN(CH_2)_3Si(OCH_3)_3$ or the like. Another good method of tilted perpendicular alignment preparation which meets said condition $0 < \alpha \leq 4°$ is that the substrate is coated with a $SiO_2$ layer to a thickness of 500 Å to 5000 Å, then given rubbing with cloth in a given direction, and then treated with a solution of $C_{18}H_{37}Si(OC_2H_5)_3$ or the like. On the other hand, for the perpendicular alignment preparation without tilt of the other substrate, the substrate is coated with a tin layer of $SiO_2$ or the like to a thickness of 500 Å to 5000 Å, and the so-coated substrate is subjected to surface treatment with surface coupling agent solution of $C_{18}H_{37}Si(OC_2H_5)_3$ or the like. In either case of alignment preparation, a thin layer of $SiO_2$, $TiO_2$ or the like is advantageously 500 Å to 5000 Å thick. A thinner layer than 500 Å may likely cause alignment irregularities, while a thicker layer than 5000 Å may likely to lower deposition strength of the layer or cause a voltage increase. More preferably, the layer thickness is 1000 Å to 2500 Å.

Figure 5:
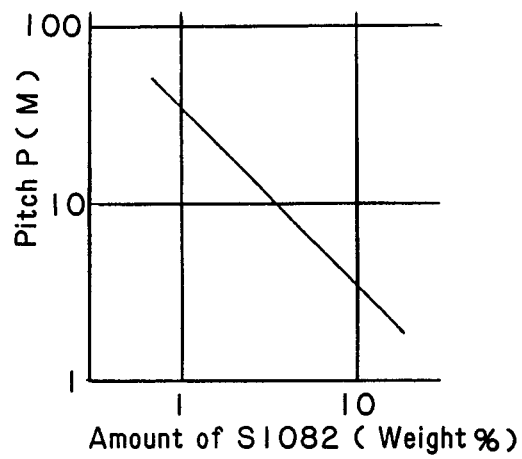
FIG. 5 is a diagram showing the relation between Ch material additions and helical pitch.

Between the two substrates thus given tilted perpendicular alignment preparation and perpendicular alignment preparation without tilt, respectively is enclosed a displaying material comprising Nn liquid crystal added with Ch material and dichroic dye. Addition of Ch material imparts a helical structure to the Nn liquid crystal and dichroic molecular alignments. Helical pitch P is determined by the type of Ch material used and the amount of the material added. If helical pitch P is equal to or shorter than the thickness d of the diaplaying material layer ($d/p \geq 1$), there develops a condition that the liquid crystal and dye molecules within the display material layer becomes aligned parallel to the substrate surface, with the result that color develops substantially to the same degree as during a voltage being applied, even when no voltage is applied: therefore, a positive contrast display cannot be obtained. In order that an achromatic condition may be present when no voltage is applied and that a color pattern may be produced upon application of a voltage, it is necessary that Ch material should be added in such a way that the hilical pitch P is longer than the thickness of the displaying material layer ($d/p \geq 1$). For example, if the thickness d of the displaying material layer is 8.5, where 2,3-dicyano-1,4-hydroquinone derivatives mixture (Chisso Corporation's EN-18) is used as Nn liquid crystal, and 2-methyl buthyl 4-(4-hexyloxy benzoyloxy)-benzoate (Merck's S1082) as Ch material, as in FIG. 5, addition of S1082 should be less than 4.0 weight % relative to the amount of EN-18 and the helical pitch P should longer than 8.5. The relation of pitch P to the thickness d of the displaying material layer does also affect response time. If P is substantially longer than d, rise time $\tau_r$ becomes longer, while if P is close to d, decay time $\tau_d$ becomes longer. From the standpoint of improvement in this regard, as well as with respect to achromatization when no voltage is applied, it is undesirable that P gets close to d. Further, in order to increase color density upon energization of the display panel, it is desirable to avoid P becoming considerably large relative to d. For practical purposes, a range of $0.2 \leq d/p \leq 0.8$ is satisfactory.

Simply from the view point of increasing color density, the more the addition of dichroic dye, the better. As the amount of dichroic dye increases, however, the display panel tends to produce color even when it is not energized. Therefore, a suitable amount of dye should be selected according to the type of dye used and taking the thickness d of the displaying material layer into consideration. Normally, where d is 7 to 10μ, a weight % range of 0.6 to 2.5 relative to the amount of Nn liquid crystal is selected for addition of dichroic dye.

Thus, a displaying material consists of Nn liquid crystal, Ch material added thereto in an amount meeting the condition $d/p < 1$, and dichroic dye in such amount as selected in consideration of achromatization requirement and display color density. The displaying material is enclosed between two electrode substrates, one of which has been given tilted perpendicular alignment preparation ($0 < \alpha \leq 4°$) and the other of which has been given perpendicular alignment preparation. Liquid crystal and dye molecules show themselves in a nematic phase in which they are aligned substantially perpendicularly to the substrates during non-voltage application. Thus, a display panel can be obtained which is free of alignment irregularities and which exhibits good achromatic behavior with little color development (FIG. 3(a)). When voltage V, higher than $V_{10}$, is applied to the display panel, as shown in FIG. 3(b), the liquid crystal 5 and dye molecules 6 between the electrodes 3 and 4 show themselves in a cholesteric phase in which they are oriented in various directions parallel to the substrate surface in areas other than in the vicinity of the electrodes; the dye molecules 6 oriented in various directions absorb light and thus a color pattern is produced. In this case, the dye molecules turn from their pre-tilted positions, thus a change taking place in their alignments. Therefore, the color pattern obtained is uniform and wormhole-like irregularities in the pattern do not arise.

The reason why the display panel exhibits good achromatic behavior when no voltage is applied, there being no alignment irregularity, is that a special combination of substrates is employed such that one of the substrates has been given tilted perpendicular alignment preparation, while the other has been given perpendicular alignment preparation (without tilt), thus these being no particular direction in which the substrates are joined together, and further that the tilt angle of molecules is substantially small. The absence of worm-hole-like density irregularity in the color pattern during voltage application may be due to the fact that the presence of tilt in a given direction causes turning of liquid crystal and dye molecules relative to a given direction.

Figure 6:
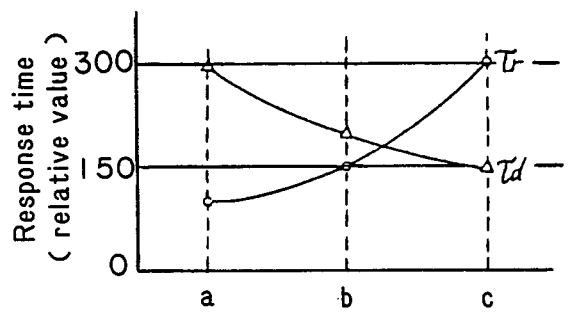
FIGS. 6 and 7 are diagrams showing comparisons between the display panel according to the invention and conventional display panel in respect of response times and dispaly voltages, respectively.
Figure 7:
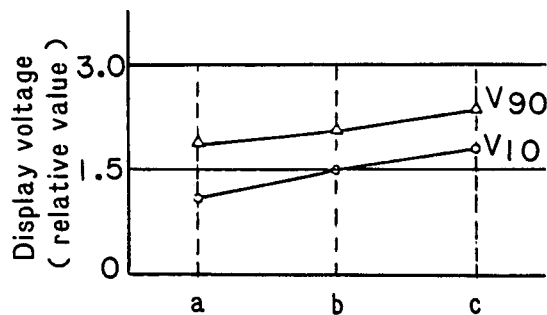

Further, it is noted that, as FIG. 6 in the case of the display panel of the invention (b in the figure) shows, rise time $\tau_r$ and decay time $\tau_d$ take values substantially intermediate between those in the case of tilted perpendicular alignment preparation (shown by character a in the figure) with respect to both substrates and those in the case of perpendicular alignment without tilt with respect to both substrates (shown by c in the figure); both $\tau_r$ and $\tau_d$ are of relatively small value, with only a minor difference between them. With regard to display voltages $V_{10}$, $V_{90}$, as FIG. 7 shows, the display panel (b) of the invention takes values somewhat between those in the case of tilted perpendicular alignment (a) of the both substrates and those in the case of perpendicular alignment without tilt (c) of the both substrates; the difference between $V_{90}$ and $V_{10}$ is smaller than in case (a) above, the slope of display voltage characteristics is relatively sharp. This is a feature suitable for multiplexing drive. On the side of manufacturing, the display panel of the invention requires tilted perpendicular alignment preparation, the more complicated one than perpendicular alignment preparation without tilt, with respect to only one substrate. In this respect, too, the invention provides an advantage over conventional display panels which require tilted perpendicular alignment preparation with respect to both substrates.

Among nematic liquid crystals having negative dielectric anisotropy for use in displaying materials are mixed liquid crystals (such as, for example, Chisso Corporation's EN-18, EN-24, EN-26, EN-30, EN-31 and the like) including 2,3-dicyanohydroquinone derivatives, such as

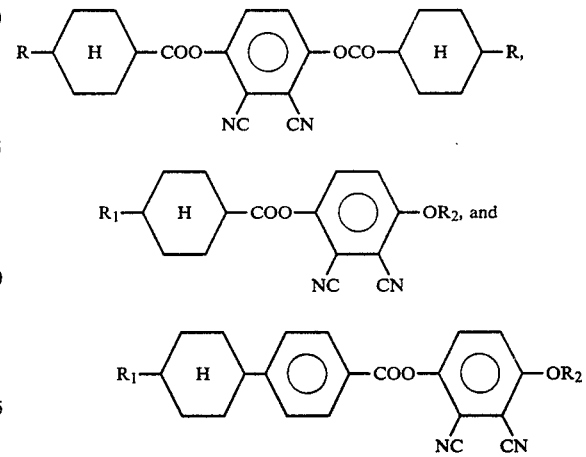

(R, $R_1$: $C_nH_{2n+1}$, $C_nH_{2n+1}O$; $R_2$: $C_nH_{2n+1}$; n is a positive integer).

These are mentioned by way of example and not by way of limitation. Chiral compounds which may be used are, without limitation to,

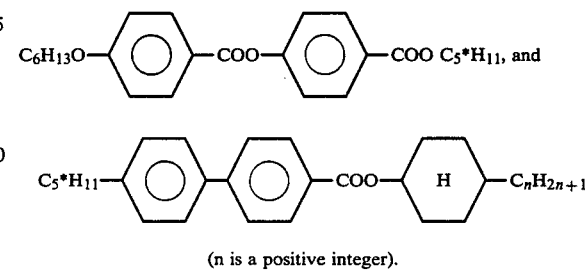

(n is a positive integer).

Other chiral compounds having asymmetric carbon can be used as well. Dichroic dyes suitable for use include, without limitation to, azo compounds such as

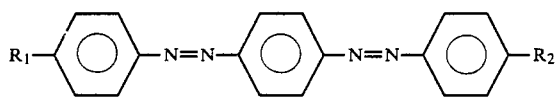

($R_1$, $R_2$: $C_nH_{2n+1}$, $C_nH_{2n+1}O$, $N(CH_3)_2$, and the like; n: positive integer)

and anthraquinone compounds such as

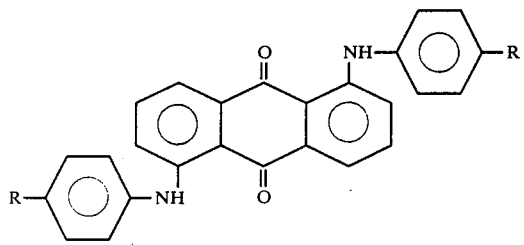

(R: $C_nH_{2b+1}$, $C_nH_{2n+1}O$, $N(CH_3)_2$, and the like; n is a positive integer).

Other dichroic dyes having high dichroic ratio and good stability can be employed as well.

An example of the invention is given below.

Of two electrode substrates of transparent glass, each provided on one side thereof with transparent indium tinoxide electrode patterns, one was given tilted perpendicular alignment preparation on its electrode side. The other substrate was given perpendicular alignment preparation without tilt. The two substrates were joined together by coating epoxy resin on their peripheries, with a gap of 8.5μ kept between them. Tilted perpendicular alignment preparation was carried out in such a way that a thin layer of $SiO_2$, 1500 Å thick was formed on the entire electrode-side surface of the substrate by coating and baking an organic silicon solution (Nippon Soda Co.'s Atolon-NSi-10), and the so formed layer was subjected to rubbing with nylon cloth about 20 times in a given direction, the substrate being then immersed in a 0.3% isopropyl-alcohol solution of octadecyl-triethoxy silane for about 2 minutes. This was a condition required for a tilt angle of 4° or below in the case of tilted perpendicular alignment with respect to the both substrates. Perpendicular alignment preparation without tilt was effected in such a way that after a thin $SiO_2$ layer was formed on the substrate in manner as above described, the substrate was immersed in a 3% isopropyl-alcohol solution of octadecyl-triethoxy silane for about 2 minutes. Between the substrates was enclosed a displaying material, which included dicyanohydroquinone derivatives mixtures (Chisso Corporation's EN-26) as Nn liquid crystal, added with 3.1 weight percent of 2-methylbutyl 4-(4-hexyloxybenzoyloxy)-benzoate (S1082 manufactured by Merck) as Ch material to obtain a helical pitch of 11.3μ, and further added with 1 weight % of anthraquinone dichroic dye (BDH's D77). A display panel was thus obtained.

This display panel exhibited good achromatic condition, free of alignment irregularities, when in not-energized condition. When a voltage was applied, it produced a uniform positive contrast color display in purple color, without density irregularity in color pattern. Provided on its back surface with a white light reflector, the panel achieved a contrast ratio of 1.5 under white light when a voltage of 3 V was applied. Display voltages $V_{10}$ and $V_{90}$ were 1.5 V and 2.1 V, somewhat higher than those in the case of tilted perpendicular alignment with respect to both substrates, but lower than those in the case of perpendicular alignment without tilt with respect to both substrates. The slope of display voltage characteristics was quite sharp. When a 32 Hz, 3 V rectangular wave voltage was applied, response times at 25° C. were such as $\tau_r$ was 150 msec and $\tau_d$ was 200 msec, much smaller, with little difference therebetween, as compared with 100 msec and 300 msec in the case of tilted perpendicular alignment with respect of both substrates, and 300 msec and 150 msec in the case of perpendicular alignment without tilt with respect to both substrates. This display panel does not require a polarizer, and therefore, it provides a bright display with a very wide viewing angle.

As above described, the present invention provides an effective solution to the problem of alignment and display irregularities. Further, it offers considerable improvements in response and voltage characteristics over conventional display panels. Hence, according to the invention, it is possible to obtain a brighter positive contrast liquid crystal color display panel with wider viewing angle.

We claim:

1. A liquid crystal color display panel including two transparent electrode-mounted substrates joined together with a gap therebetween, a displaying material composed of a system formed by dissolving optically active materials (chiral compounds) and dichroic dyes in nematic liquid crystals having negative dielectric anisotropy, the displaying material being enclosed in said gap for utilization of a change in the degree of light absorption of said displaying material upon application of a voltage across the electrodes, said display panel comprising one of said substrates being such that it has been given tilted perpendicular alignment preparation so as to allow liquid crystal and dichroic dye molecules to be tilt-aligned, in the vicinity of said one substrate, in a given direction at a tilt angle α meeting the relationship $0 < \alpha \leq 4°$ relative to a normal line to said one substrate, the other of said substrates being such that it has been given perpendicular alignment preparation so as to allow liquid crystal and dichroic dye molecules to be aligned, in the vicinity of said other substrate, without tilting from a normal line to said other substrate, said displaying material being such that the relationship between its thickness d as a material layer and its helical pitch p is d/p<1.

2. The liquid crystal color display panel as set forth in claim 1, wherein said substrate subjected to tilted perpendicular alignment preparation is such that its surface has been subjected to oblique vapor deposition of an oxide compound or fluoride compound and subsequently treated with a solution of a perpendicular orientation agent.

3. The liquid crystal color display panel as set forth in claim 1, wherein said substrate subjected to tilted perpendicular alignment preparation is such that it has a thin layer of an oxide compound, 500–5000 Å in thickness, formed on its surface, said layer having been subjected to rubbing with cloth in a given direction, then treated with a solution of a perpendicular orientation agent.

4. The liquid crystal color display panel as set forth in claim 1, wherein said substrate subjected to perpendicular alignment preparation is such that it has thin layer of an oxide compound, 500–5000 Å in thickness, formed on its surface, said layer having been treated with a solution of a perpendicular orientation agent.

5. The liquid crystal color display panel as set forth in claim 2, wherein said oxide compound is selected from the group consisting of SiO, $SiO_2$, $CeO_2$, and $Al_2O_3$, and said fluoride compound is selected from the group consisting of $MgF_2$, $CaF_2$, and LiF.

6. The liquid crystal color display panel as set forth in claim 3 or 4, wherein said oxide compound is selected from the group consisting of $SiO_2$, $TiO_2$, $CeO_2$, and $Al_2O_3$.

7. The liquid crystal color display panel as set forth in claim 2, 3, or 4, wherein said perpendicular orientation agent is $C_{18}H_{37}(CH_3)_2ClN(CH_2)_3Si(OCH_3)_3$ or $C_{18}H_{37}Si(OC_2H_5)_3$.

8. The liquid crystal color display panel as set forth in claim 1, wherein said nematic liquid crystal having negative dielectric anisotropy is a mixed material containing at least one kind of dicyanohydroquinone derivative expressed as

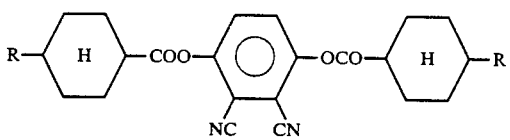

(R: $C_nH_{2n+1}$ or $C_nH_{2n+1}O$ n: positive integer),

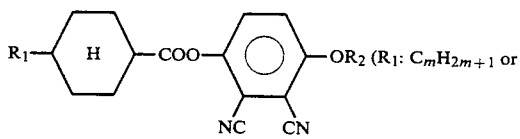

$C_mH_{2m+1}O$, $R_2$: $C_mH_{2m+1}$, m: positive integer), or

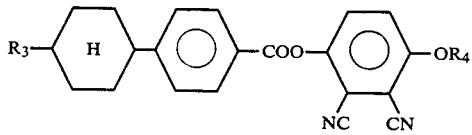

($R_3$: $C_mH_{2m+1}$, $R_4$: $C_nH_{2n+1}$, m and n: positive integers).

9. The liquid crystal color display panel as set forth in claim 1, wherein said optically active material (chiral compound) is

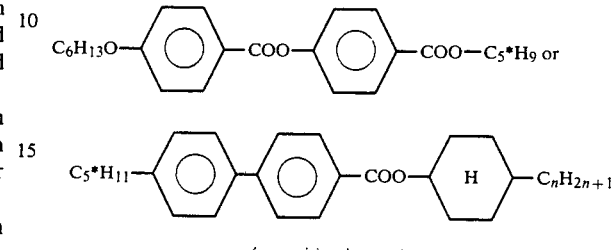

(n: positive integer).

10. The liquid crystal color display panel as set forth in claim 1, wherein said dichroic dyes are azo compounds

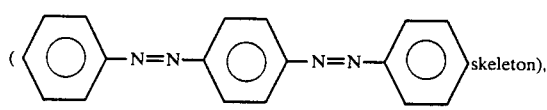

anthraquinone compounds

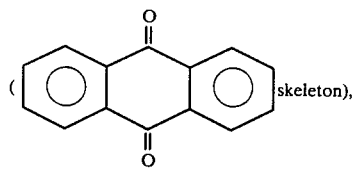

or a mixture of these compounds.

11. The liquid crystal color display panel as set forth in claim 1, wherein said relationship between the thickness d of said displaying material and the helical pitch p there is $0.2 \leq d/p \leq 0.8$.

* * * * *